United States Patent
Straub et al.

(10) Patent No.: US 9,954,477 B2
(45) Date of Patent: Apr. 24, 2018

(54) ELECTRICAL SWITCH

(71) Applicant: Marquardt Verwaltungs-GmbH, Rietheim-Weilheim (DE)

(72) Inventors: Christian Straub, Schaffhausen (CH); Roger Hügli, Bronschhofen (CH)

(73) Assignee: Marquardt GmbH, Rietheim-Weilheim (DE)

( * ) Notice: Subject to any disclaimer, the term of this patent is extended or adjusted under 35 U.S.C. 154(b) by 110 days.

(21) Appl. No.: 13/904,211

(22) Filed: May 29, 2013

(65) Prior Publication Data
US 2013/0293159 A1 Nov. 7, 2013

Related U.S. Application Data

(63) Continuation of application No. PCT/EP2011/005976, filed on Nov. 29, 2011.

(30) Foreign Application Priority Data

Nov. 30, 2010 (DE) .................. 10 2010 052 771

(51) Int. Cl.
*H02P 31/00* (2006.01)
*B25F 5/00* (2006.01)
*G08C 19/00* (2006.01)

(52) U.S. Cl.
CPC ............ *H02P 31/00* (2013.01); *B25F 5/00* (2013.01); *G08C 19/00* (2013.01); *H04B 2203/547* (2013.01); *H04B 2203/5458* (2013.01)

(58) Field of Classification Search
USPC ....................................... 318/479, 490, 778
See application file for complete search history.

(56) References Cited

U.S. PATENT DOCUMENTS 6,913,087 B1 * 7/2005 Brotto .................. B25B 21/00
173/1
7,330,129 B2 * 2/2008 Crowell et al. ............ 340/815.4
(Continued)

FOREIGN PATENT DOCUMENTS

DE     100 57 926 A1    7/2001
DE     102 12 064 A1   10/2003
(Continued)

OTHER PUBLICATIONS

Marquardt: Series 2711—Switch with Microcontroller for Management of Lithium-Ion Batteries Up to 18 V, Aug. 2008, internet (online), http://marquardt1.testk-k.de/bausteine.net/file/showfile.aspx?downdaid-7053&guid=29ebc6a0-5793-4972-b863-a6bf65c478b7&fd=3.
(Continued)

*Primary Examiner* — Eduardo Colon Santana
*Assistant Examiner* — Said Bouziane
(74) *Attorney, Agent, or Firm* — Burr & Brown, PLLC

(57) ABSTRACT

An electrical switch, particularly for an electrical appliance having an electric motor. The switch has two electrical supply connections for the supply voltage, particularly for a rechargeable battery, and two electrical motor connections for the supply of voltage to the electric motor. Furthermore, the switch has a control electronics unit, such as a microprocessor, a microcontroller or the like, for executing control processes in the electrical appliance, wherein particularly the control electronics unit operates by means of a piece of software. The switch can also be connected with a data line for communication between the control electronics unit and an external device, wherein particularly one of the electrical motor connections is used as an interface for the data line. Furthermore, the invention relates to an appropriate method (Continued)

for communication by an electrical switch with an external device.

16 Claims, 4 Drawing Sheets

(56) References Cited

U.S. PATENT DOCUMENTS

| | | | | |
|---|---|---|---|---|
| 8,379,737 | B2* | 2/2013 | De Natale | H02H 1/0076 375/259 |
| 2003/0011245 | A1* | 1/2003 | Fiebig | B25F 5/00 307/48 |
| 2003/0182016 | A1 | 9/2003 | Fiebig et al. | |
| 2005/0011655 | A1* | 1/2005 | Crowell | B25B 23/14 173/1 |
| 2006/0087285 | A1* | 4/2006 | Phillips | B25F 5/00 320/114 |
| 2009/0200961 | A1* | 8/2009 | Straub | B25F 5/021 315/291 |
| 2010/0061181 | A1* | 3/2010 | Malackowski | A61B 17/151 366/142 |
| 2013/0123777 | A1* | 5/2013 | Monson | H02J 7/00 606/41 |

FOREIGN PATENT DOCUMENTS

| | | |
|---|---|---|
| DE | 10 2007 035 095 A | 1/2009 |
| DE | 10 2007 035 095 A1 | 1/2009 |
| DE | 10 2009 007 566 A1 | 8/2009 |
| EP | 1 559 511 A2 | 8/2005 |
| EP | 1 585 230 A1 | 10/2005 |
| GB | 2 352 376 A1 | 1/2001 |
| WO | 01/73917 A1 | 10/2001 |

OTHER PUBLICATIONS

Karsten Donat, "AVR Bootloader FastBoot by Peter Dannegger," Nov. 29, 2010, internet (online), http://www.mikrocontroller.net/wikisoftware/index.php?title=AVR_Bootloader_FastBoot_von_Peter_Dannegger&oldid=53042.

Marquardt: Series 2711—Switch with Microcontroller for Management of Lithium-Ion Batteries Up to 18 V, Aug. 2008, internet (online), http://marquardt1.testk-k.de/bausteine.net/file/showfile.aspx?downdaid=7053&guid=29ebc6a0-5793-4972-b863-a6bf65c478b7&fd=3.

German Search Report dated Dec. 8, 2011.
International Search Report and Written Opinion dated Jun. 9, 2012.

* cited by examiner

ELECTRICAL SWITCH

CROSS REFERENCE TO RELATED APPLICATIONS

This application is a continuation of International Application No. PCT/EP2011/005976 filed Nov. 29, 2011, which designated the United States, and claims the benefit under 35 USC § 119(a)-(d) of German Application No. 10 2010 052 771.8 filed Nov. 30, 2010, the entireties of which are incorporated herein by reference.

FIELD OF THE INVENTION

The invention relates to an electrical switch.

BACKGROUND OF THE INVENTION

Such switches are used in electrical appliances, the electrical appliance preferably being able to be an electric tool having an electric motor, specifically a rechargeable battery powered and/or a mains powered electric tool, particularly drills, grinders, saws, planes, angle grinders or the like. However, the electrical appliance may also be a domestic appliance, such as a kitchen appliance, a vacuum cleaner or the like.

Such an electrical switch has two electrical supply connections for the supply voltage, particularly for a rechargeable battery, and two electrical motor connections for the supply of voltage to the electric motor. Furthermore, the switch has a control electronics unit, such as a microprocessor, a microcontroller or the like, for executing control processes in the electrical appliance. By way of example, the electric motor of the electric tool can be operated by the control process at a speed preselected by the user in order to allow a workpiece to be machined in a manner suited to the workpiece. Usually, the control electronics unit in the electric tool operates by means of a piece of software. The control electronics unit is provided with the relevant software when the switch is manufactured. There is no provision for a later change to and/or adjustment of the software.

SUMMARY OF THE INVENTION

The present invention is based on the object of developing the electrical switch further such that there is the possibility of subsequent provision with a piece of software and/or a subsequent software change. In particular, the aim is for an electric tool switch to be able to be programmed with a new piece of application software externally.

This means particularly that the aim is to provide a technical opportunity for the nonvolatile program and/or data memory of a microcontroller in an electric tool switch to have a new content, the application software or other data, written to it. This content is intended to be supplied to the electric tool switch externally, as far as possible without further additional electrical connections other than those already present, namely the battery+, battery−, motor1 and motor2 connections.

In the switch according to the invention, a data line for communication between the control electronics unit and an external device can be provided, wherein particularly one of the electrical motor connections is used for the data line. In other words, the data line can be connected to the one electrical motor connection for data transmission between the switch and the external device as correspondingly required. As a result, the control electronics unit can be provided with an appropriate piece of software when required, which means that particularly a method for communication with an electric tool switch with the aim of loading a piece of software into the fitted microcontroller is provided.

In one simple embodiment, it is possible to use an asynchronous serial data protocol for the data transmission via the data line.

The invention furthermore provides a method for communication by an electrical switch, which has a control electronics unit that operates by means of a piece of software, with an external device, wherein the switch can have a data line for communication between the control electronics unit and the external device connected to it. This method can involve the use of one of the electrical motor connections for the data transmission on the data line.

In a further embodiment, the external device is a programming appliance such that the control electronics unit can be programmed with a piece of application software.

The switch usually has an operating element for connecting a switch-on contact to one of the electrical supply connections. It is then possible for switching on the switch-on contact to prompt the control electronics unit to be activated. If appropriate, this can also prompt the execution of a piece of application software to be started.

Expediently, the application software is stored in a program memory of the control electronics unit. In a functionally reliable embodiment, the control electronics unit has a piece of boot loader software for programming the control electronics unit with a piece of application software. It is then firstly a further possibility for operating the operating element and application software which is not present in the program memory to prompt direct execution of the boot loader software which is present. Secondly, operating the operating element and application software which is already present in the program memory can prompt the boot loader software which is present to be started only when there is a predefined condition present. By way of example, the condition may be that no electric motor is connected to the electrical motor connections or that the supply voltage on the electrical supply connections is in a particular range of values.

In a further simple and still functionally reliable embodiment, the boot loader software can monitor, during operation thereof, the motor connection used for the data transmission for data. The serial input data delivered can be collected by the boot loader software on the basis of a prescribed protocol. Furthermore, the output data can be sent serially by the boot loader software via the motor connection that is used for the data transmission.

The advantages attained with the invention are particularly that the electrical switch, particularly the electric tool switch, can be manufactured without software, specifically just with a boot loader. The advantage of this is that the software can subsequently be produced and altered at the request of the customer. It is also possible for production batches put together from relatively small subsets to be delivered to the customer, which then in turn itself forms the variants by programming with the desired application software.

BRIEF DESCRIPTION OF THE DRAWINGS

An exemplary embodiment of the invention with various developments and embodiments is shown in the drawings and is described in more detail below.

DETAILED DESCRIPTION OF THE INVENTION

Figure 1:
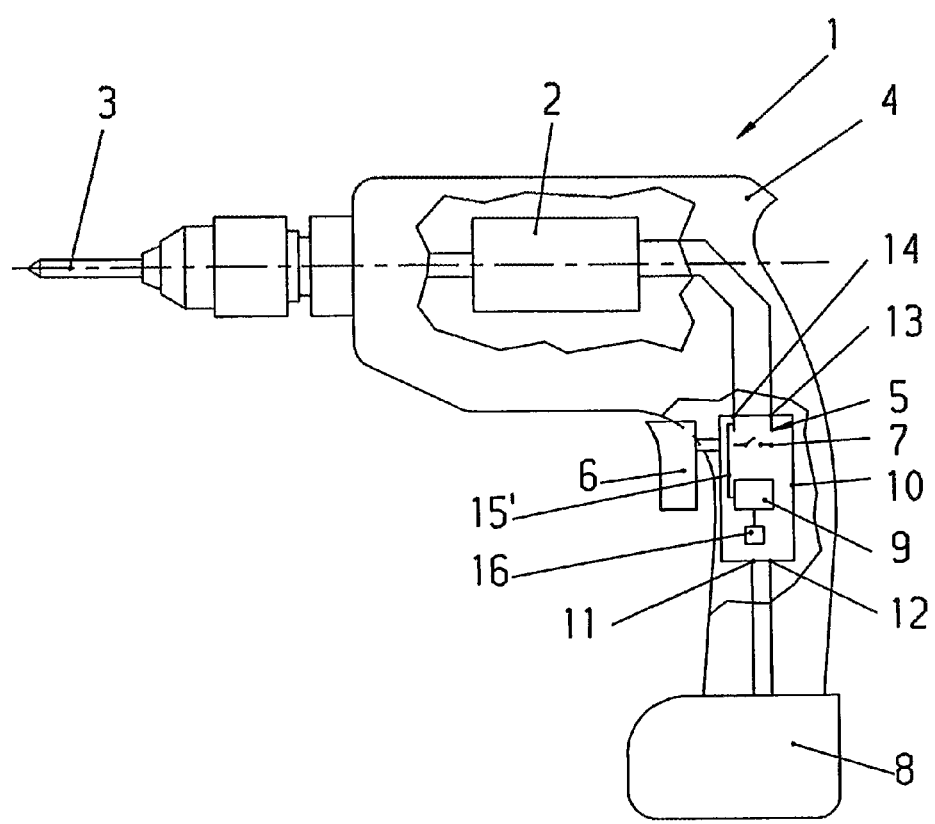
FIG. 1 schematically shows an electric tool having an electrical switch, wherein the housing of the electric tool is shown in partially broken-open form.

FIG. 1 shows an electric tool 1 having an electric motor 2 for driving a tool 3. This may be a rechargeable battery powered and/or mains powered electric tool. By way of example, FIG. 1 shows a rechargeable battery powered drill as the electric tool 1 which is operated at a supply voltage from a mobile energy store 8 in the style of a rechargeable battery. It goes without saying that the electric tool 1 may also be a grinder, a saw, a plane, an angle grinder or the like.

The housing 4 of the electric tool 1 contains a switch 5 with a switch housing 10. The switch 5 is held in the housing 4 such that an operating element 6 of the switch 5 that can be moved by the user manually projects from the housing 4. The switch 5 has a contact system 7 on which the operating element 6 acts for the purpose of changeover, as a result of which the supply voltage from the energy store 8 for the electric tool 1, specifically particularly for operating the electric motor 2, can be switched on and/or off by the user by means of the operating element 6. To this end, the switch 5 has two electrical supply connections 11, 12 for the supply voltage for the rechargeable battery 8 and two electrical motor connections 13, 14 for the supply of voltage to the electric motor 2.

Finally, the switch 5 comprises an electrical and/or electronic circuit arrangement for controlling and/or regulating the electric motor 2. The circuit arrangement is used as a control electronics unit 9, for example for setting and/or altering the speed of the electric motor 2 in line with the position of the operating element 6 that has been moved by the user. The control electronics unit 9 comprises a microprocessor, a microcontroller or the like and is expediently situated in the switch housing 10. The control electronics unit 9, which operates by means of a piece of software, is also used for executing control processes in the electric tool 1. As already mentioned, one control process in the control electronics unit 9 is used for actuating the electric motor 2. For this, the control electronics unit 9 uses a pulse width modulation signal to operate the electric motor 2 in line with the speed that has been set by the user by means of the operating element 6. When required, the control electronics unit 9 can also execute further control processes by virtue of the relevant software being stored in the electrical switch 5, for example in a program memory 16 of the control electronics unit 9. Switching on the switch-on contact 7 on one of the electrical supply connections 11, 12 by means of the operating element 6 prompts the control electronics unit 9 to be activated and possibly the execution of an appropriate piece of application software to be started.

Figure 2:
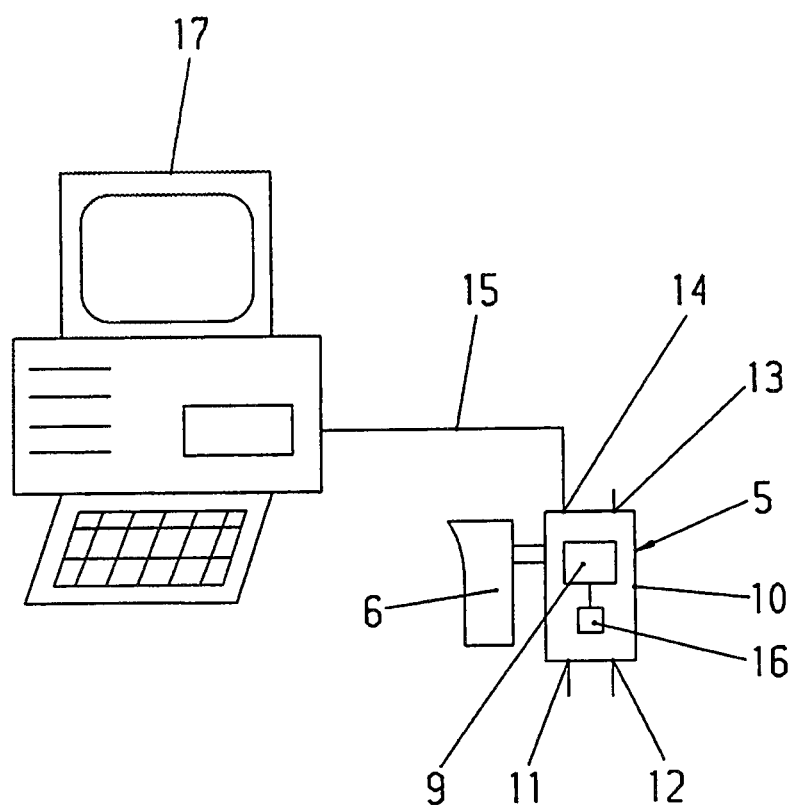
FIG. 2 schematically shows the electrical switch from FIG. 1 connected to a computer.

In order to store appropriate software in the electrical switch 5 or else in order to transmit other data, a data line 15' is provided in the switch 5. For this data line 15', one of the electrical motor connections 13, 14 is used, specifically the motor connection 14 in the present case, which the internal data line 15' uses to set up a connection between the motor connection 14 and the control electronics unit 9. Using the internal data line 15' and a further external data line 15, communication between the control electronics unit 9 and an external device 17 is then possible, as shown in FIG. 2. In the present case, the external device 17 is a computer which is used for reading data from the switch 5, for writing data to the switch 5 and/or for transmitting appropriate software to the electrical switch 5. The computer 17 can therefore be used as a programming appliance such that the control electronics unit 9 can be programmed with a piece of application software. For the purpose of simple embodiment, the data line 15 which can be connected to the motor connection 14 of the switch 5 is embodied as a "single-wire connection". An asynchronous serial data protocol is then used for the data transmission via the data line 15.

The control electronics unit 9 may have a piece of boot loader software for programming the control electronics unit 9 with a piece of application software. Operation of the operating element 6 by the user and of application software which is not present in the program memory 16 prompts direct execution of the boot loader software which is present. If, by contrast, the program memory 16 already contains a piece of application software, the boot loader software which is present is started only when there is a predefined condition. By way of example, the condition may be that no electric motor 2 is connected to the electrical motor connections 13, 14, as shown in FIG. 2 by means of the electric tool switch 5, which is not yet fitted in the housing 4 of the electric tool 1. Another predefined condition for this may also be that the supply voltage on the electrical supply connections 11, 12 is in a particular range of values. It is then a simple matter to program even an electric tool switch 5 which is already fitted in the housing 4 of the electric tool 1 with a piece of application software. The boot loader software monitors, during operation thereof, the motor connection 14 used for the data transmission for data. The serial input data delivered in the process are collected by the boot loader software on the basis of a prescribed protocol. The output data are sent serially by the boot loader software via the motor connection 14 that is used for the data transmission.

Figure 3:
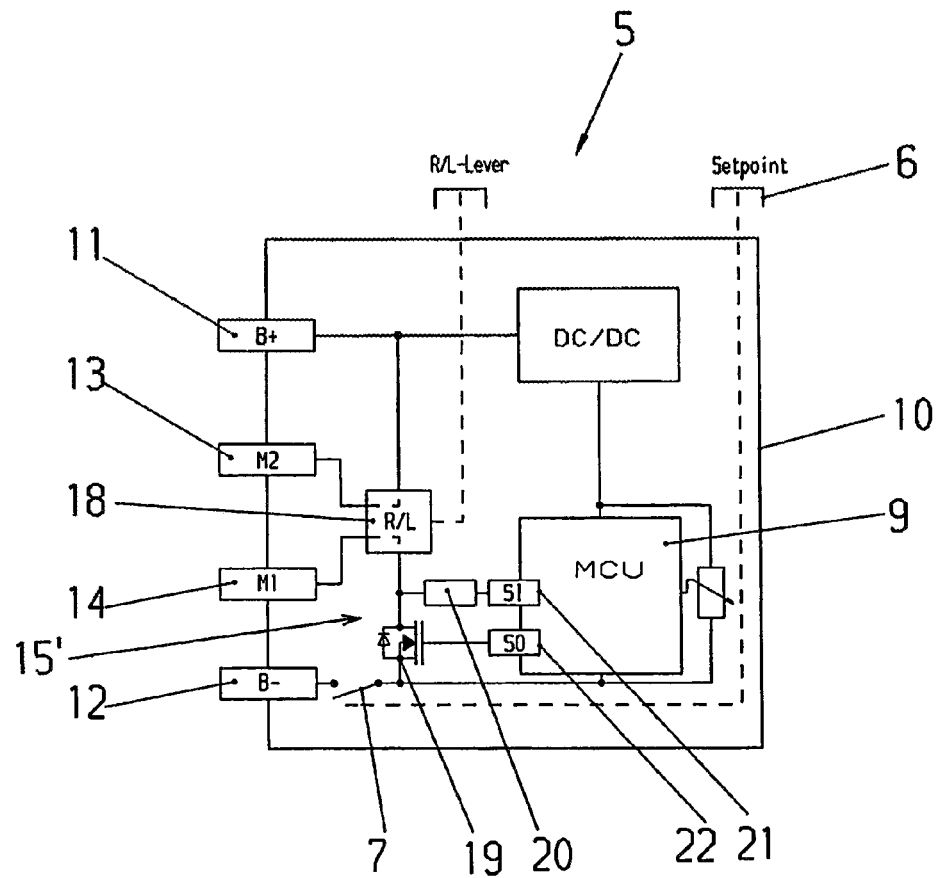
FIG. 3 shows the electrical switch designed for DC (Direct Current) motors as a schematic block diagram.

The more detailed embodiment of the programmable electric tool switch 5 can be seen in FIG. 3. The aim is for the electric tool switch 5 to be able to be programmed by a programming appliance 17 (see FIG. 2) externally, that is to say in a sealed state in line with the delivery state. This is intended to be accomplished by using the four connections 11, 12, 13, 14, namely battery B+, battery B−, motor M1, motor M2, of the switch 5 without expending them by means of additional connections. This small set of connection options prompts the use of a serial protocol for the data transmission. This protocol and an additional small piece of software, what is known as the boot loader, are jointly used to provide the option of receiving a piece of application software and application data externally, writing them to the nonvolatile memory 16 (see FIG. 1) and reading them again for control purposes.

Supply Connections:

The microcontroller 9 needs to be supplied with current and voltage externally, and this is accomplished by using the supply connection 11 (B+) and the supply connection 12 (B−). Without a relatively high level of circuitry and/or software involvement (boot loader) inside the electric tool switch 5, these two connections 11, 12 cannot be used for data transmission. Therefore, the connections 11, 12 (B+ and B−) continue to be used as pure supply connections.

Communication Connection:

One of the two motor connections 13, 14 is always connected to the connection 11 (B+) via the internal change-over switch 18 for right/left running of the electric motor 2, specifically to the motor connection 13 (M2) in the present case. Therefore, only the second motor connection 14 (M1) now remains as a communication connection.

A power Mosfet 19 for actuating the electric motor 2 and a resistor 20 for measuring the motor current for the electric motor 2 can be used as communication channels for the data output 22 (SO: Serial-Out) and the data input 21 (SI: Serial-In) on the microcontroller 9. Hence, this connection which is already present in the switch 5 between the second motor connection 14 (M1) and the microcontroller 9 is used as an internal data line 15'.

Activation of the Boot Loader:

The pushbutton 6 (setpoint) can be used to close the switch-on contact 7 on the supply connection 12 (B−). This activates the electronics unit 9 and starts the microcontroller 9.

1a. If there is no application software present in the program memory 16, the boot loader software which is already present is executed directly.

1b. If there is already a piece of application software present in the program memory 16, however, it starts and a predefined condition is used as a criterion for starting the boot loader, e.g. no electric motor 2 connected to the motor connections 13, 14 (M1 and M2) or the supply voltage is in a particular range.

2. The boot loader listens at its data input 21 (SI) to determine whether data are being delivered via the communication connection 14. If this is the case, the boot loader can collect these serial input data on the basis of a particular protocol and can possibly send output data serially via the data output 22 (SO).

Serial Data Transmission:

The communication takes place serially between the electric tool switch 5 and an externally connected programming appliance 17 as shown in FIG. 2. So that this works smoothly, the communication follows a prescribed protocol. Serial data transmissions may be asynchronous or synchronous. Asynchronous data transmission is used. Since only one communication line 15 is present, the clock is prescribed as a time frame by the programming appliance 17, and the programming appliance 17 and the boot loader communicate within this time window. Hence, despite asynchronous data transmission, synchronization is effected between transmitter (programming appliance 17) and receiver (electric tool switch 5).

Tolerance of the Data Transmission Frequency:

The advantage of such an approach is that the synchronization of programming appliance 17 and electric tool switch 5 allows a relatively great scope of tolerance of approximately ±10%, in comparison with approximately ±3%, for example, in the case of an RS232 interface. This advantage has a particularly positive effect because, for commercial reasons, only a cheap RC oscillator can be used in the microcontroller 9, and although said RC oscillator can barely comply with an accuracy of ±3%, it has an accuracy of approximately ±10%. This means that it is not necessary for the transmitter and receiver to be tuned to one another, as in the case of conventional asynchronous data transmission. The boot loader software can therefore be developed more easily, in other words with a saving on memory.

Figure 4:
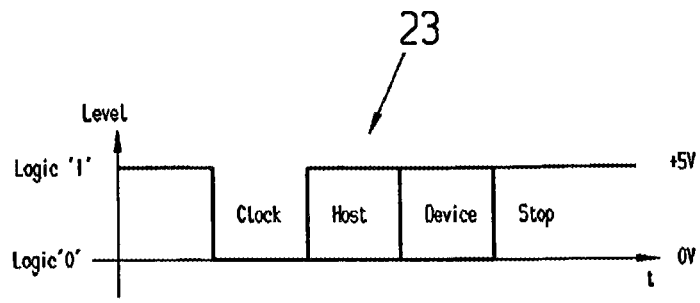
FIG. 4 shows a bit frame for the data transmission.

Transmission of Individual Bits (Bit Frame):

The transmission of individual bits of the data from the programming appliance 17 to the electric tool switch 5 and back again is effected using a time-division multiplex method and is therefore bidirectional. This time frame is called a bit frame 23, which is shown in FIG. 4. In line with FIG. 4, a bit to be transmitted is introduced by the programming appliance 17 by means of a clock bit (Clock), this is then followed by a data bit (Host) from the programming appliance 17, and then the boot loader is provided with a time slot of a bit length so as for its part to send a bit (Device) to the programming appliance 17. An inverted clock bit (Stop) completes this time frame 23.

Figure 5:
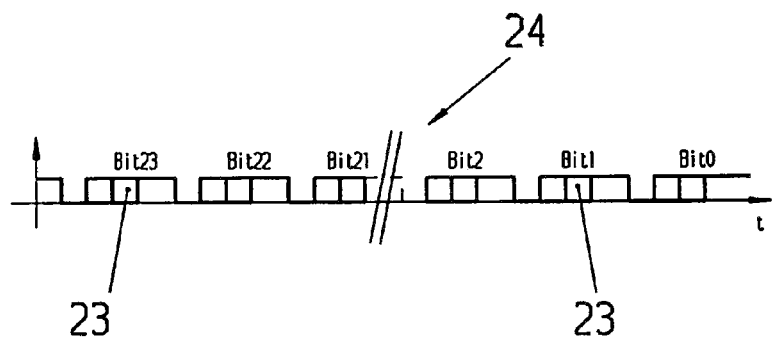
FIG. 5 shows a command response frame for the data transmission.

Transmission of Commands and Responses:

A command-response frame 24 as shown in FIG. 5 consists of 24 bit frames 23. The command-response frame 24 is split into a command frame and a response frame on the basis of the communication direction.

Figure 6:
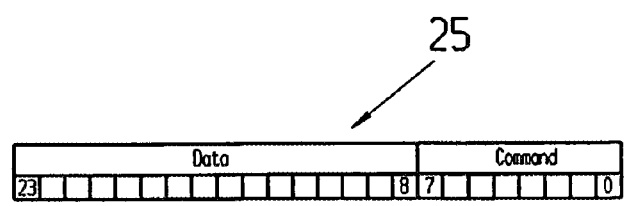
FIG. 6 shows a command frame for the data transmission.
Figure 7:
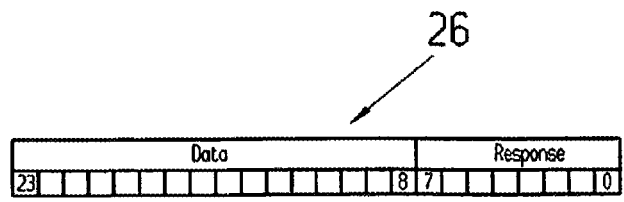
FIG. 7 shows a response frame for the data transmission.

Commands:

The command frame 25 shown in FIG. 6 contains all 24 host bits, which are split into a 16-bit data word (Bit23-Bit8) and an 8-bit command byte (Bit7-Bit0). Commands may be read, erase and write to the nonvolatile program and/or data memory 16.

Responses:

The response frame 26 contains all device bits, which are split into a 16-bit data word (Bit23-Bit8) and an 8-bit response byte (Bit7-Bit0). A command is followed by a respective response, specifically the read command is followed by the memory content and the erase and write commands are followed by a confirmation.

Communication and Programming:

The method described can be used to provide the opportunity for a programming appliance 17 to send a command to an electric tool switch 5 or to the microcontroller 9 thereof. The programming appliance 17 can thus put the electric tool switch 5 into the state in which the boot loader is activated by the microcontroller 9 and awaits commands. The communication between the programming appliance 17 and the switch 5 is initiated by the programming appliance 17. During the transmission of the first command frame 25, the boot loader will respond with an empty response frame 26. While further command frames 25 are now being sent to the switch 5, it is now possible for the boot loader to pack the response to the respective preceding command into the response frame 26. The programming appliance 17 can now process the responses further, react to them and in turn send new commands to the boot loader. Hence, the nonvolatile memory 16 of the microcontroller 9 can be read, erased and have new content, namely a piece of application software and/or application data, written to it.

The invention is suitable not only for DC voltage (DC) electric tools but also for AC voltage (AC) electric tools which contain a microcontroller for control. Such mains powered AC electric tools use phase control and/or reverse phase control for speed setting. Furthermore, the invention is explained with reference to an electric tool but is not limited to the exemplary embodiment described and shown. Instead, it also covers all developments by a person skilled in the art within the context of the invention defined by the patent claims. It is thus possible for such an electrical switch having a program interface also to be used in other electrical appliances, for example, in domestic appliances, in garden tools or the like.

LIST OF REFERENCE SYMBOLS

1: Electric tool
2: Electric motor

3: Tool
4: Housing (of electric tool)
5: Switch/electric tool switch
6: Operating element/pushbutton
7: Contact system/switch-on contact
8: Energy store/rechargeable battery
9: Control electronics unit/electronics unit/microcontroller
10: Switch housing
11,12: Supply connection/connection
13,14: Motor connection/connection/communication connection
15,15': Data line
16: Program memory/memory/program and/or data memory
17: External device/programming appliance
18: Changeover switch
19: Power Mosfet
20: Resistor
21: Data input
22: Data output
23: Bit frame/time frame
24: Command-response frame
25: Command frame
26: Response frame

The invention claimed is:

1. An electrical switch for an electrical appliance having an electric motor, the switch comprising a switch housing having two electrical supply connections, each directly connected to the supply voltage, two electrical motor connections, each directly connected to the electric motor for the supply of voltage to the electric motor, a switch contact system and a control electronics unit for executing control processes in the electrical appliance, wherein an entirety of the switch contact system and the control electronics unit is arranged and contained in the switch housing, with the control electronics unit being operated by means of a piece of software, the switch further comprising an interface for a data line for communication between the control electronics unit and an external device, wherein one of the two electrical motor connections is used as the interface for the data line, and wherein an internal data line is positioned between and electrically connects the one of the two electrical motor connections and the control electronics unit in the switch housing.

2. The electrical switch as claimed in claim 1, wherein an asynchronous serial data protocol is used for the data transmission via the data line.

3. The electrical switch as claimed in claim 1, wherein the electrical appliance is an electric tool.

4. The electrical switch as claimed in claim 3, wherein the supply voltage is a rechargeable battery.

5. The electrical switch as claimed in claim 1, wherein the control electronics unit is a microprocessor or a microcontroller.

6. A method for communication of an electrical switch for an electrical appliance having an electric motor, the switch comprising a switch housing having two electrical supply connections, each directly connected to the supply voltage, two electrical motor connections, each directly connected to the electric motor for the supply of voltage to the electric motor, a switch contact system and a control electronics unit for executing control processes in the electrical appliance, wherein an entirety of the switch contact system and the control electronics unit is arranged and contained in the switch housing, with the control electronics unit being operated by means of a piece of software, the switch further comprising an interface for a data line for communication between the control electronics unit and an external device and connecting the external device and the interface via the data line for communication to the control electronics unit, wherein one of the two electrical motor connections is used as the interface for data transmission on the data line, and wherein an internal data line is positioned between and electrically connects the one of the two electrical motor connections and the control electronics unit in the switch housing.

7. The method of claim 6, wherein the external device is a programming appliance such that the control electronics unit can be programmed with a piece of application software.

8. The method of claim 7, wherein the switch further comprises an operating element for connecting a switch-on contact to one of the electrical supply connections, and switching on the switch-on contact prompts the control electronics unit to be activated and the execution of a piece of application software to be started.

9. The method of claim 8, wherein the control electronics unit comprises a piece of boot loader software for programming the control electronics unit with a piece of application software, and, if application software is not present in the program memory, wherein operating the operating element prompts direct execution of the boot loader software.

10. The method of claim 9, wherein the boot loader software monitors, during operation thereof, the electrical motor connection used for the data transmission for data.

11. The method of claim 10, wherein the serial input data delivered are collected by the boot loader software on the basis of a prescribed protocol.

12. The method of claim 10, wherein the output data are sent serially by the boot loader software via the electrical motor connection that is used for the data transmission.

13. The method of claim 7, wherein the application software is stored in a program memory of the control electronics unit.

14. The method of claim 8, wherein the control electronics unit comprises a piece of boot loader software for programming the control electronics unit with a piece of application software, and, if application software is already present in the program memory, wherein operating the operating element prompts the boot loader software which is present to be started only when there is a predefined condition present.

15. The method of claim 14, wherein said predefined condition is that no electric motor is connected to the electrical motor connections or that the supply voltage on the electrical supply connections is in a particular range of values.

16. The method of claim 14, wherein the boot loader software monitors, during operation thereof, the electrical motor connection used for the data transmission for data.

* * * * *